US 11,406,901 B2
Aug. 9, 2022

(12) United States Patent
Ante et al.

(54) ADDRESSABLE ASSETS IN SOFTWARE DEVELOPMENT

(71) Applicant: Unity IPR ApS, Copenhagen (DK)

(72) Inventors: Joachim Christoph Ante, Copenhagen (DK); Stephen Joseph Palmer, Round Rock, TX (US); Paul Emile Burslem, Austin, TX (US); William David Ramsour, Pflugerville, TX (US); Ryan Caltabiano, Austin, TX (US); Joseph Franklin Scheinberg, Austin, TX (US)

(73) Assignee: Unity IPR ApS, Copenhagen (DK)

( * ) Notice: Subject to any disclaimer, the term of this patent is extended or adjusted under 35 U.S.C. 154(b) by 0 days.

This patent is subject to a terminal disclaimer.

(21) Appl. No.: 17/065,384

(22) Filed: Oct. 7, 2020

(65) Prior Publication Data
US 2021/0016179 A1 Jan. 21, 2021

Related U.S. Application Data

(63) Continuation of application No. 16/411,616, filed on May 14, 2019, now Pat. No. 10,814,232.
(Continued)

(51) Int. Cl.
A63F 13/77 (2014.01)
A63F 13/352 (2014.01)
(Continued)

(52) U.S. Cl.
CPC ............ *A63F 13/77* (2014.09); *A63F 13/352* (2014.09); *A63F 13/49* (2014.09); *G06F 8/71* (2013.01);
(Continued)

(58) Field of Classification Search
CPC ........ A63F 13/77; A63F 13/352; A63F 13/49; G06F 16/901; G06F 8/71; G06F 12/0646
(Continued)

(56) References Cited

U.S. PATENT DOCUMENTS 6,181,336 B1    1/2001  Chiu et al.
7,181,731 B2 *  2/2007  Pace ......................... G06F 8/60
                                                                 717/136
(Continued)

FOREIGN PATENT DOCUMENTS

CN    112384290        2/2021
JP    2002366356 A    12/2002
(Continued)

OTHER PUBLICATIONS

"International Application Serial No. PCT US2019 032166, International Preliminary Report on Patentability dated Nov. 26, 2020", 7 pages.
(Continued)

*Primary Examiner* — Allen Chan
(74) *Attorney, Agent, or Firm* — Schwegman Lundberg & Woessner, P.A.

(57) ABSTRACT

A method for tracking game asset locations is disclosed. Content is created for an application using a first asset. The first asset includes asset data that describes at least a part of the content associated with the asset. The asset data is placed within one or more files within a location within one or more memories. A catalog associated with the application is created on the server. A catalog entry is created for the first asset. The catalog entry includes an address that uniquely identifies the first asset. A request is received from the application for asset data associated with the first asset, the request including the address. The address and the catalog are used to determine location data associated with the
(Continued)

address. The determined location data is used to retrieve the asset data at the determined location. The retrieved asset data is returned to the application.

20 Claims, 7 Drawing Sheets

Related U.S. Application Data

(60) Provisional application No. 62/671,244, filed on May 14, 2018.

(51) Int. Cl.
*A63F 13/49* (2014.01)
*G06F 16/901* (2019.01)
*G06F 8/71* (2018.01)
*G06F 12/06* (2006.01)

(52) U.S. Cl.
CPC ........ *G06F 12/0646* (2013.01); *G06F 16/901* (2019.01)

(58) Field of Classification Search
USPC .......................................................... 463/43
See application file for complete search history.

(56) References Cited

U.S. PATENT DOCUMENTS

| | | | |
|---|---|---|---|
| 7,465,231 | B2 | 12/2008 | Lewin et al. |
| 8,100,766 | B2 | 1/2012 | Leblanc et al. |
| 8,317,606 | B2 | 11/2012 | Graham et al. |
| 10,814,232 | B2 | 10/2020 | Ante et al. |
| 2006/0136964 | A1 | 6/2006 | Diez et al. |
| 2006/0259386 | A1 | 11/2006 | Knowlton et al. |
| 2009/0149246 | A1 | 6/2009 | Opaluch |
| 2009/0282403 | A1 | 11/2009 | Poole et al. |
| 2017/0054778 | A1 | 2/2017 | Tornielli |
| 2017/0323027 | A1 | 11/2017 | Nguyen et al. |
| 2019/0344181 | A1 | 11/2019 | Ante et al. |

FOREIGN PATENT DOCUMENTS

| | | |
|---|---|---|
| JP | 2005182419 A | 7/2005 |
| JP | 2021524098 A | 9/2021 |
| WO | WO-2019222176 A1 | 11/2019 |

OTHER PUBLICATIONS

U.S. Appl. No. 16/411,616, Notice of Allowance dated Jun. 23, 2020, 8 pgs.
International Application Serial No. PCT/US2019/032166, International Search Report dated Jul. 18, 2019, 5 pgs.
International Application Serial No. PCT/US2019/032166, Written Opinion dated Jul. 18, 2019, 5 pgs.
Otamere, Omoruyi, "Managing Digital Assets in Game Development", [Online] Retrieved from the internet: <URL: http://www.gamedev.net/reference/articles/article1371.asp>, (May 21, 2001), 5 pgs.
U.S. Appl. No. 16/411,616 U.S. Pat. No. 10,814,232, filed May 14, 2019, Addressable Assets in Software Development.
Japanese Application Serial No. 2020-564069, Notification of Reasons for Refusal dated Dec. 14, 2021, w/ English Translation, 6 pgs.
United Kingdom Application Serial No. 2019710.9, Office Action dated Mar. 24, 22, 3 pgs.
"Japanese Application Serial No. 2020-564069, Response filed Mar. 9, 2022 to Notification of Reasons for Refusal dated Dec. 14, 2021", with English claims, 12 pages.

\* cited by examiner

ADDRESSABLE ASSETS IN SOFTWARE DEVELOPMENT

CROSS REFERENCE TO RELATED APPLICATIONS

This application is a continuation of and claims the benefit of priority under 35 U.S.C. § 120 to U.S. patent application Ser. No. 16/411,616, filed on May 14, 2019, which claims the benefit of U.S. Provisional Application No. 62/671,244 filed May 14, 2018, entitled "SYSTEM AND METHOD FOR ADDRESSABLE ASSETS IN SOFTWARE DEVELOPMENT," each of which is incorporated by reference herein in its entirety.

TECHNICAL FIELD

The present disclosure relates to tools for use in managing the tracking of data for virtual assets in games and other applications.

BACKGROUND OF THE INVENTION

In the world of video game creation, there are many tools that guide creators through the major processes of game creation, including designing, building and deploying games. Many of the tools allow for novice computer programmers (and non-computer programmers) to perform some of the steps within the processes. However, the deployment process is still quite difficult when it comes to the aspect of packaging and tracking data for digital assets (e.g., including characters, background objects, weapons, special effects, and the like) for a game or other application. This is due in part to the large number of operating systems and devices that a game might have as deployment targets.

For example, operating systems and devices often have different formatting requirements for using digital assets. Also, high quality games typically have a large number of virtual assets, which becomes problematic for mobile games where device memory and download limits may become issues. Furthermore, most games evolve after they are first released (e.g., adding different game modes or adding game levels) with new virtual assets, making the tracking of virtual assets and the associated data more and more complicated over time.

For a game developer, structuring digital assets for a game in a way that allows efficient loading at game time is difficult. One solution is to divide the digital assets into chunks that are downloaded when needed (e.g., when an asset within a chunk is needed). A limitation when using chunks of digital assets is the high level of expertise required from a game developer to understand and manage their complexity. Using a chunk of assets often involves writing code to build, load, unload, and manage the chunk and its dependencies. Incremental builds (e.g., only updating the chunk when a new asset is added to a game) do not work reliably, often forcing a rebuild of all assets within a chunk whenever an asset is updated, which results in a potentially huge time expense that increases proportional to the number of assets in the game. This can cause a refactoring of code as a game's complexity increases over time.

BRIEF DESCRIPTION OF THE DRAWINGS

Features and advantages of example embodiments of the present disclosure will become apparent from the following detailed description, taken in combination with the appended drawings, in which.

It will be noted that throughout the appended drawings, like features are identified by like reference numerals.

DETAILED DESCRIPTION

Figure 1:
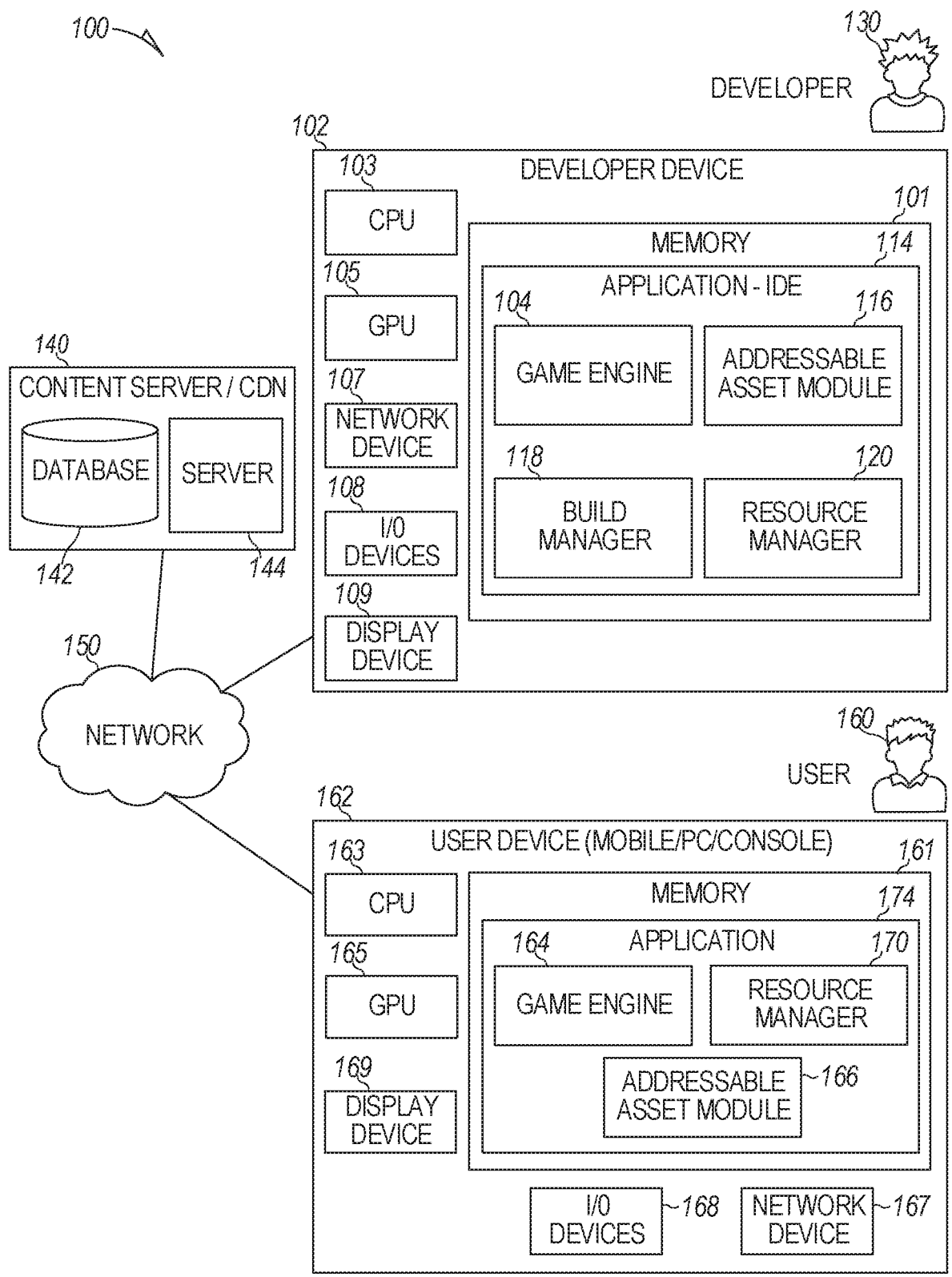
FIG. 1 is a schematic illustrating an addressable asset system, in accordance with one embodiment.

The description that follows describes example systems, methods, techniques, instruction sequences, and computing machine program products that comprise illustrative embodiments of the disclosure, individually or in combination. In the following description, for the purposes of explanation, numerous specific details are set forth in order to provide an understanding of various embodiments of the inventive subject matter. It will be evident, however, to those skilled in the art, that various embodiments of the inventive subject matter may be practiced without these specific details.

There is described herein an Addressable Asset System which provides efficient runtime loading of digital assets for a game using an address. The Addressable Asset System handles asset management for a game and simplifies content creation and deployment. In accordance with an embodiment, during the playing of a game (e.g., execution of game code), the Addressable Asset System allows the game code to simply query an address associated with a digital asset at runtime and receive data which describes the digital asset that resides at the address. Using the Addressable Asset System, a development studio can substantially improve iteration time on a project (e.g., development of a game), enabling the studio to design, code, and test projects more often, resulting in a higher quality game or application.

In example embodiments, a method for tracking game asset locations is disclosed. Content is created for an application using a first asset. The first asset includes asset data that describes at least a part of the content associated with the asset. The asset data is placed within one or more files within a location within one or more memories. A catalog associated with the application is created on the server. A catalog entry is created for the first asset. The catalog entry includes at least an address and location data, the address being a unique identifier for the first asset and the location data being a description of the location of the first asset. A request is received from the application for asset data associated with the first asset, the request including the address. The address and the catalog are used to determine the location data associated with the address. The determined location data is used to retrieve the asset data at the determined location. The retrieved asset data is returned to the application.

The term 'environment' or 'game environment' used throughout the description herein is understood to include 2D digital environments (e.g., 2D video game environments, 2D simulation environments, and the like), 3D digital environments (e.g., 3D game environments, 3D simulation environments, 3D content creation environment, virtual reality environments, and the like), and augmented reality environments that include both a digital (e.g., virtual) component and a real-world component.

The term 'game object', used herein is understood to include any digital object or digital element within an environment (e.g., a game environment). A game object can represent almost anything within the environment; including characters, weapons, scene elements (e.g., buildings, trees, cars, treasures, and the like), backgrounds (e.g., terrain, sky, and the like), lights, cameras, effects (e.g., sound and visual), animation, and more. A game object is associated with data that defines properties and behavior for the object.

The terms 'asset', 'game asset', and 'digital asset', used herein are understood to include any data that can be used to describe a game object or can be used to describe an aspect of a game or project. For example, an asset can include data for an image, a 3D model (textures, rigging, and the like), a group of 3D models (e.g., an entire scene), an audio sound, a video, animation, a 3D mesh and the like. The data describing an asset may be stored within a file, or may be contained within a collection of files, or may be compressed and stored in one file (e.g., a compressed file), or may be stored within a memory. The data describing an asset can be used to instantiate one or more game objects within a game at runtime.

Throughout the description herein, the term 'asset bundle' refers to a grouping of data that describes one or more assets. The grouping of data can be within a file or a group of files (e.g., a zip file) or within a memory. The data within an asset bundle is data which is stored external to an executable game file and which is used by a game during runtime in order to create or modify objects within the game. Two or more asset bundles can have dependencies between each other; e.g., an asset representing a material in asset bundle 'A' can reference an asset representing a texture in asset bundle 'B'. Furthermore, during runtime of the game, an asset bundle may be represented by a programming object (e.g., an object oriented programming object) that can be interacted with via code (e.g., from within the executable game file) to load data describing an asset from a specific asset bundle into the game. The asset bundle programming object can include a mapping of location (e.g., a file path to a file within the asset bundle) to an object within a game.

Turning now to the drawings, systems and methods, including non-routine or unconventional components or operations, or combinations of such components or operations, for addressable assets, in accordance with embodiments of the invention are illustrated. In accordance with an embodiment, FIG. 1 shows an Addressable Asset System 100 for providing efficient runtime loading of assets by addresses. In the example embodiment, the Addressable Asset System 100 includes a developer device 102 operated by a developer 130 (e.g., a game developer, artist, or the like), a user device 162 operated by a user 160, and a content server 140 coupled in networked communication via a network 150 (e.g., a cellular network, a Wi-Fi network, the Internet, a wired local network, and the like). In some embodiments, the content server 140 may be a content delivery network (CDN). The user device 162 is a computing device capable of providing a multimedia experience (e.g., a video game, a simulation, a virtual reality experience, an augmented reality experience, and the like) to the user 160. In some embodiments, the user device 162 is a mobile computing device, such as a smartphone, tablet computer and head mounted display (HMD) such as virtual reality HMDs, augmented reality HMDs and mixed reality HMDs, and the like. In some embodiments, the user device 162 is a desktop computer or game console. The developer device 102 is a computing device capable of providing an integrated development environment IDE or a game development platform (e.g., such as Unity™ game engine) to the developer 130. In some embodiments, the developer device 102 is a mobile computing device, such as a smartphone, tablet computer and head mounted display (HMD) such as virtual reality HMDs, augmented reality HMDs and mixed reality HMDs, and the like. In some embodiments, the developer device 102 is a desktop computer.

In accordance with an embodiment, the content server 140 includes a database 142 and a server 144. The database 142 includes assets used by an application (e.g., a game) which resides on the user device 162.

In accordance with an embodiment, the developer device 102 includes one or more central processing units 103 (CPUs), and graphics processing units 105 (GPUs). The CPU 103 is any type of processor, processor assembly comprising multiple processing elements (not shown), having access to a memory 101 to retrieve instructions stored thereon, and execute such instructions. Upon execution of such instructions, the instructions implement the developer device 102 to perform a series of tasks as described herein. The memory 101 can be any type of memory device, such as random access memory, read only or rewritable memory, internal processor caches, and the like.

The developer device 102 also includes one or more input/output devices 108 such as, for example, a keyboard or keypad, mouse, pointing device, and touchscreen. The developer device 102 further includes one or more display devices 109, such as a computer monitor, a touchscreen, and a head mounted display, which may be configured to display digital content including video, a video game environment, an integrated development environment and a virtual simulation environment to the developer 130. The display device 109 is driven or controlled by the one or more GPUs 105 and optionally the CPU 103. The GPU 105 processes aspects of graphical output that assists in speeding up rendering of output through the display device 109. The developer device 102 also includes one or more networking devices 107 (e.g., wired or wireless network adapters) for communicating across the network 150.

The memory 101 in the developer device 102 can be configured to store an application 114 (e.g., an integrated development environment IDE) which includes a game engine 104 (e.g., executed by the CPU 103 or GPU 105) that communicates with the display device 109 and also with other hardware such as the input device(s) 108 to present the application to the developer 130. The game engine 104 would typically include one or more modules that provide the following: animation physics for game objects, collision detection for game objects, rendering, networking, sound, animation, and the like in order to provide the user with an application environment (e.g., video game or simulation environment). The application 114 includes an addressable asset module 116 that provides various Addressable Asset System 100 functionality as described herein. The application 114 includes a build manager 118 and a resource manager 120. Each of the game engine 104, the application 114, the build manager 118, the resource manager 120 and the addressable asset module 116 includes computer-executable instructions residing in the memory 101 that are executed by the CPU 103 and optionally with the GPU 105 during operation. The game engine 104 includes computer-executable instructions residing in the memory 101 that are executed by the CPU 103 and optionally with the GPU 105 during operation in order to create a runtime program such as a game engine. The application 114 includes computer-executable instructions residing in the memory 101 that are executed by the CPU 103 and optionally with the GPU 105 during operation in order to create a runtime application program such as an IDE. The addressable asset module 116, the build manger 118 and the resource manager 120 may be integrated directly within the game engine 104, or within the application 114, or may be implemented as external pieces of software (e.g., plugins).

In accordance with an embodiment, the user device 162 includes one or more central processing units 163 (e.g., similar to the CPU 103 in the developer device 102), and graphics processing units 165 (e.g., similar to the GPU 105 in the developer device 102). The CPU 163 is any type of processor, processor assembly comprising multiple processing elements (not shown), having access to a memory 161 to retrieve instructions stored thereon, and execute such instructions. Upon execution of such instructions, the instructions implement the user device 162 to perform a series of tasks as described herein. The memory 161 can be any type of memory device similar to the memory 101 on the developer device 102.

The user device 162 also includes one or more input/output devices 168 similar to the input/output device 108 on the developer device 102. The user device 162 further includes one or more display devices 169, similar to the display device 109 on the developer device 102, which may be configured to display digital content including video, a video game environment, and a virtual simulation environment to the user 160. The display device 169 is driven or controlled by the one or more GPUs 165 and optionally the CPU 163. The GPU 165 processes aspects of graphical output that assists in speeding up rendering of output through the display device 169. The user device 162 also includes one or more networking devices 167 (e.g., wired or wireless network adapters) for communicating across the network 150.

In accordance with an embodiment, the memory 161 in the user device 162 can be configured to store an application 174 (e.g., a video game, a simulation, a virtual reality experience, an augmented reality experience) which includes a game engine 164 (e.g., executed by the CPU 163 or GPU 165) that communicates with the display device 169 and also with other hardware such as the input device (s) 168 to present an application to the user 160. The game engine 164 is similar to the game engine 104 on the developer device 102. The application 174 includes an addressable asset module 166 that provides various Addressable Asset System 100 functionality as described herein. The application 174 includes a resource manager 170. Each of the game engine 164, the application 174, the resource manager 170 and the addressable asset module 166 includes computer-executable instructions residing in the memory 161 that are executed by the CPU 163 and optionally with the GPU 165 during operation. The game engine 164 includes computer-executable instructions residing in the memory 161 that are executed by the CPU 163 and optionally with the GPU 165 during operation in order to create a runtime program such as a game engine. The application 174 includes computer-executable instructions residing in the memory 161 that are executed by the CPU 163 and optionally with the GPU 165 during operation in order to create a runtime application program such as a video game or simulator. The addressable asset module 166 and the resource manager 170 may be integrated directly within the game engine 164, or within the application 174, or may be implemented as external pieces of software (e.g., plugins).

Figure 2:
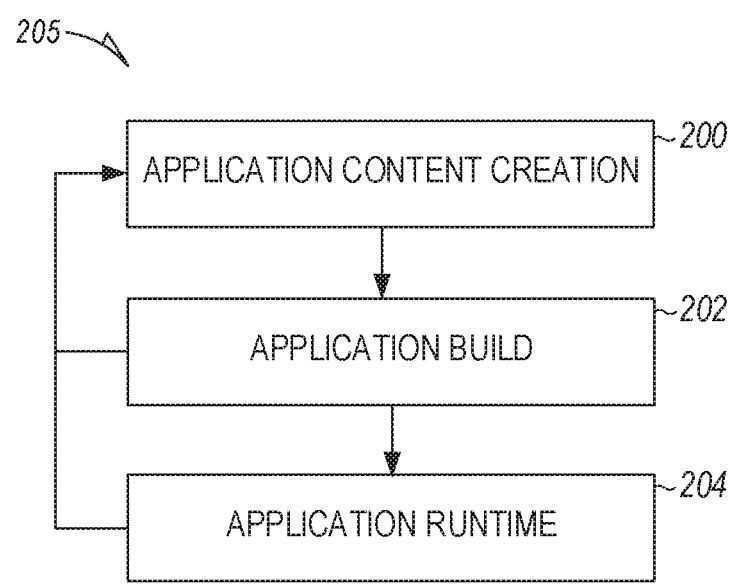
FIG. 2 is a schematic illustrating a development cycle using an addressable asset system, in accordance with one embodiment.

In accordance with an embodiment and shown in FIG. 2 is an application development cycle 205 for creating an application using the Addressable Asset System 100. A first process in the cycle 205 is application content creation 200 wherein the developer 130 uses the developer device 102 to create content for an application (e.g., a video game, a virtual reality experience, a movie, a simulation, or the like). For example, the developer 130 could use the application 114, and the game engine 104 therein, to create the content by creating a 3D scene using game objects and assigning properties and behaviors to the game objects. A second process in the cycle 205 is an application build 202, wherein a standalone executable application is created which is capable of running on an operating system (e.g., including Microsoft Windows™ operating systems, Apple™ operating systems, Linux operating systems, Android™ operating systems and the like). The executable application can include an executable file and any other data files (e.g., resource files) the executable file might need. When building standalone executable applications, the resulting files will vary depending on the build target operating system. For example, files within the executable application may be different for each operating system. A third process in the cycle 205 is a runtime process 204 wherein the executable application runs (e.g., executes) on a user device 162 and presents the application (e.g., the game, virtual reality experience, movie, simulation or the like) to the user 160.

Figure 3:
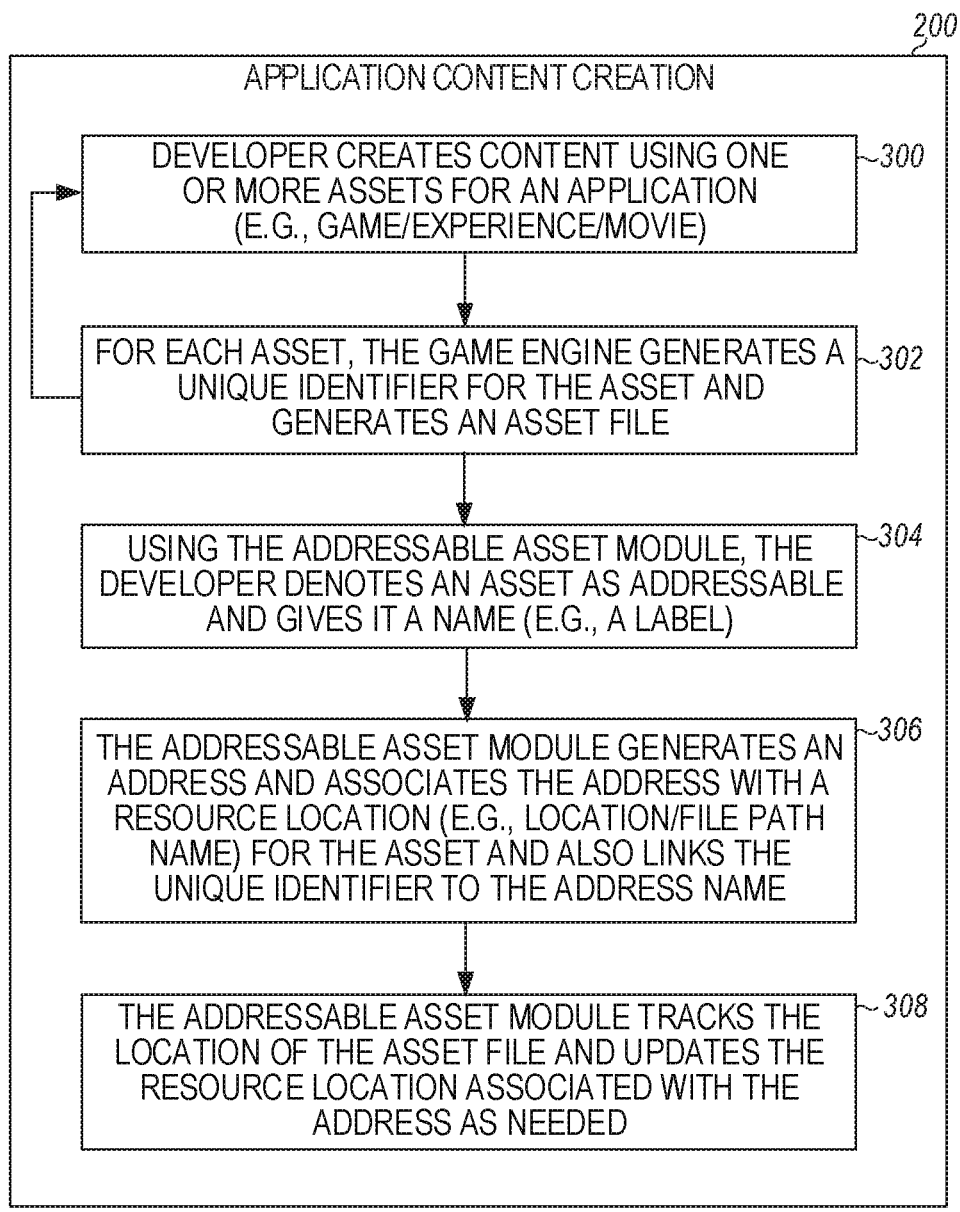
FIG. 3 is a flowchart of a content creation process using an addressable asset system, in accordance with one embodiment.

In accordance with an embodiment and shown in FIG. 3 are operations of the application content creation process 200 from the application development cycle 205. At operation 300, the developer 130 creates content for an application, using one or more assets. As part of the creation process, the developer 130 can import assets for the application, and can create assets for the application. Creating content includes creating game objects (e.g., characters and scenery), game levels and more. At operation 302, the game engine 104 generates a unique identification (or unique ID) for each asset (e.g., including numeric, alpha, alphanumeric or any type of string identification). The unique ID is a permanent unique identifier that identifies one asset. Data that defines an asset is stored in one or more files. At operation 304, using the Addressable Asset System 100, the developer 130 indicates that an asset is to be addressable (e.g., via a graphical user interface generated by the module 116 or via code and an Application Interface (API) provided by the module 116). In accordance with an embodiment, an addressable asset has an associated name (e.g., a string label) for easy identification and referencing of the addressable asset. In some embodiments, a label may be shared by a group of addressable assets. The label for the addressable asset provides a secondary identifier which can be used for runtime loading of a plurality of similar assets. For example, a game may include several types of space hazards and which are labeled 'spaceHazards' and which can all be accessed with a single command that uses the label as input (e.g. LoadAll("spaceHazards")). At operation 306, the addressable asset module 116 provides an address for the asset and associates the address with a location for the asset data (e.g., a file path name). In accordance with an embodiment, the location includes physical locations such as a content server 140 (e.g., a content delivery network), remote servers and local data storage (e.g., a local hard drive on the developer device 102). The address identifies the asset for efficient retrieval at runtime (e.g., when the game is being played). In accordance with an embodiment, the asset address is initialized to a string value of a file path location of a file containing data for the asset. At operation 308, the addressable asset module 116 tracks a location of the asset data (e.g., by tracking the file or files that contain the data) as the data is moved (e.g., by the developer).

Figure 4:
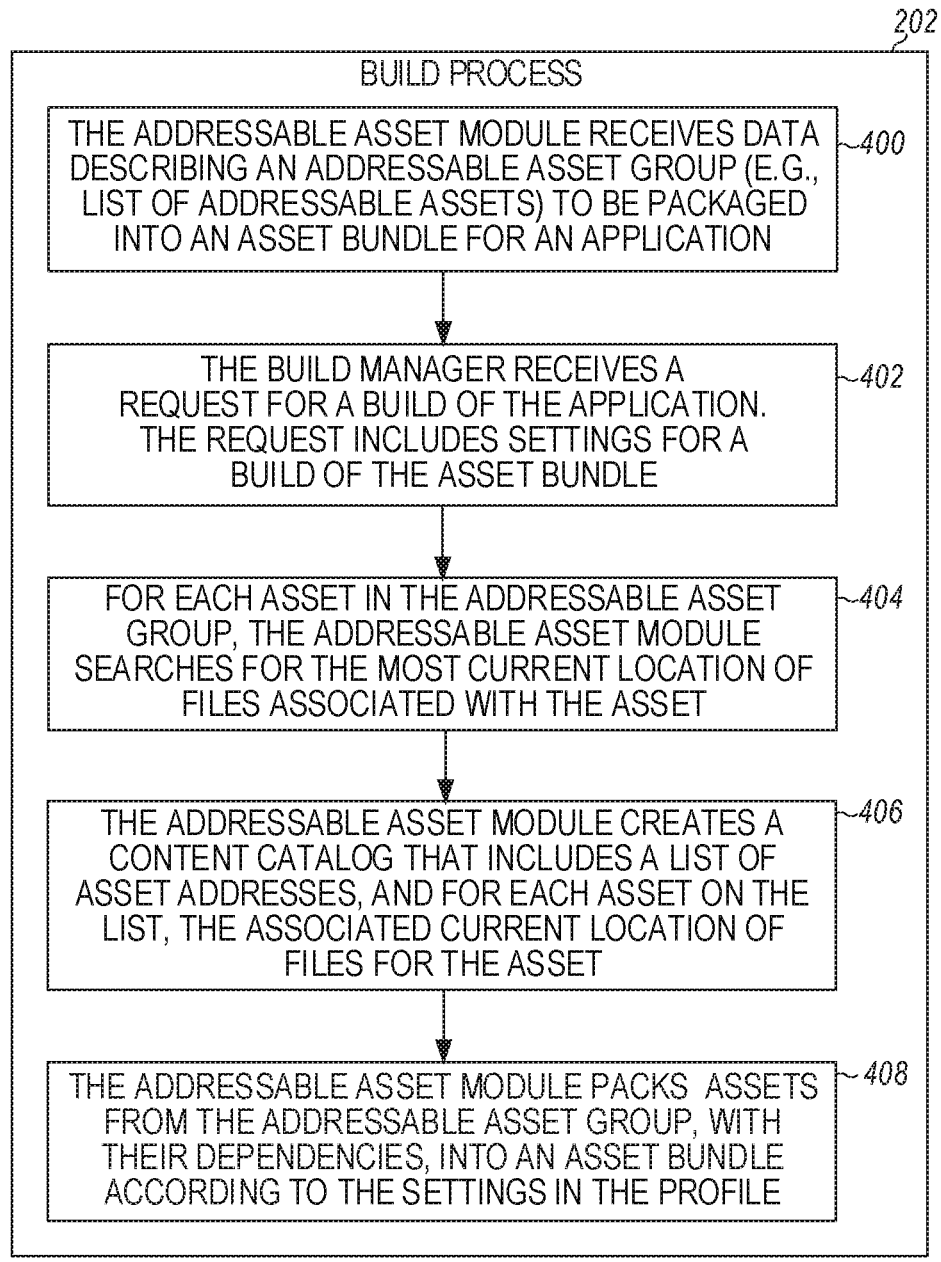
FIG. 4 is a flowchart of a build process using an addressable asset system, in accordance with one embodiment.

In accordance with an embodiment and shown in FIG. 4 is a build process 202 using an Addressable Asset System 100. At operation 400 of the build process 202, the addressable asset module 116 receives data describing an addressable asset group (e.g., a list of addressable assets) to be packaged into an asset bundle. For example, the developer 130 may create the addressable asset group using a user interface provided by the module 116 or the game engine 114. At operation 402, the build manager 118 receives a request for a build of the application. The request includes profile data (e.g., created by the developer) that includes settings for a build of the asset bundle (e.g., a build including a packaged version of the asset bundle ready for use by an executable application). As part of operation 402 of the build process 202, the developer may make the request and create the profile (e.g., via a graphical user interface). At operation 404 of the build process 202, for each asset in the addressable asset group, the addressable asset module 116 searches for the most current location of the asset files (e.g., the most current file path). At operation 406 of the build process 202, the addressable asset module 116 creates a content catalog for the application which includes one or more asset bundles associated with the application. The content catalog includes a list of asset addresses wherein each asset in the one or more asset bundles is associated with at least one asset address entry in the list. In accordance with an embodiment, for each asset address entry on the list, there is provided data for the location of the files describing the asset. The content catalog provides a mapping between an asset address and at least one location containing data describing the asset associated with the asset address. Each content catalog is associated with an executable application (e.g., the executable application can contain data pointing to the content catalog to which it is associated). The content catalog can also include instructions for loading the data describing the asset into the application. At operation 408 of build process 202, the addressable asset module 116 packs assets from the addressable asset group, with their dependencies, into an asset bundle according to the settings in the request. The addressable asset module 116 understands complex asset dependency chains and packs bundles efficiently, even when assets are moved or renamed (e.g., due to the fact that the assets are tracked by the addressable asset module 116). In accordance with an embodiment, as part of operation 408, the addressable asset module 116 separates duplicate assets and places them in a separate bundle for cleaner loading at runtime. A duplicate asset is a single asset which is a dependency for two or more assets. In accordance with an embodiment, the addressable asset module 116 prioritizes a subset of assets to be included in an asset bundle (e.g., including assets for a user interface menu, a game or application tutorial, and first-level game content). As part of operation 408, the addressable asset module 116 can split content builds based on a maximum size limit denoted in the profile. For example, the addressable asset system 100 can be configured to limit a size of a built application (e.g., 100 MB) and funnel remaining assets into asset bundles as downloadable content in order to optimize the packaging of content for a game or application, reducing the downloading of data to a device over a network and reducing the loading of the data into memory.

Figure 5:
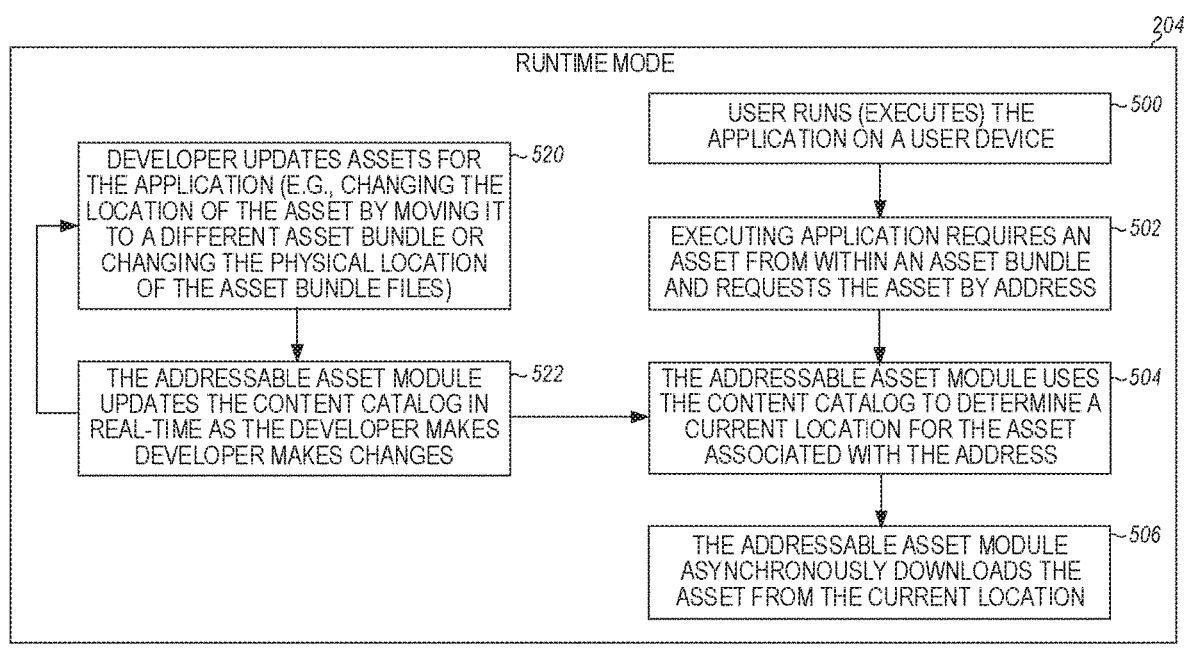
FIG. 5 is a flowchart of a runtime process using an addressable asset system, in accordance with one embodiment.

In accordance with an embodiment, and shown in FIG. 5, is the runtime mode 204 of the development cycle 205, whereby the application is downloaded and executed on the user device 162 in order to present the user 160 with a runtime version of the application. During runtime of the application, the addressable asset module 166 within the application 174 loads assets from the asset bundle into memory 161 on the user device 162 (e.g., for use by the application). The Addressable Asset System 100, using the mapping within the content catalog, allows loading of one or more addressable assets (e.g., an entire scene of assets) by name (e.g., the label or the address) at runtime, regardless of which asset bundle the one or more assets are in or where the asset bundle is located (e.g., on a remote device over a network or on a local device) or whether the addressable asset has been moved by the developer. Changes in asset location are tracked and updated in real-time in the content catalog (e.g., by the addressable asset module 116 in operation 308 and operation 406), so the addressable asset module 166 always includes a current location of an addressable asset. Specifying an asset by address empowers developers create applications that load assets at runtime without the developer needing to write specific code to directly track the location of data for the asset on a disk, or a server, or a content delivery network (CDN).

In accordance with an embodiment, and in reference to FIG. 5, at operation 500 of the runtime mode 204, the application runs (e.g., is executed) on the user device 162. For example, the application may be executed by a user operating the user device 162 (e.g., in order to play a game via a runtime version of the application 174). In accordance with an embodiment, at operation 502 of the runtime mode 204, the application 174 (while executing) requires an asset from within an asset bundle. The executing application determines the address for the required asset and sends a request that includes the address to the addressable asset module 166. The request includes the address and a request for data associated with the required asset (e.g., asset data within the asset files). In accordance with an embodiment, at operation 504 of the runtime mode 204, the addressable asset module 166 communicates over the network 150 with (e.g., sends a request) the content catalog on the content server 140 to determine a current location for the data associated with the address. In accordance with an embodiment, at operation 506 of the runtime mode 204, the addressable asset module 166 asynchronously downloads the required asset data from the current location received from the content catalog.

In accordance with an embodiment, the addressable asset system 100 includes dependency management whereby the content catalog includes dependency information for each address entry within the catalog. Accordingly, at runtime as part of operation 504 and operation 506, the addressable asset module 116 receives data associated with dependent assets for any requested address (e.g., without specifying the location of the dependencies). For example, the application 174 can request an asset only by its address or label and it will receive data regarding its dependent assets.

In accordance with an embodiment, with the asynchronous loading within operation 506, the requested assets and the dependencies of the requested assets can reside anywhere (locally, remote server or CDN) for loading in any order (e.g., as opposed to synchronous loading, whereby a local asset with dependencies would require the dependencies to be local and would also require that they be loaded directly following the asset load). By using asynchronous downloading and loading into memory for use by the executing application, the Addressable Asset System 100 gives users the flexibility to move assets (e.g., from a local build group to a remote build group) without changing code within the application 174. Asynchronous Loading combined with addresses allows for the decoupling of the unique asset identifier (e.g., created in operation 302) from the location, packaging, and loading in order to allow these aspects to change during the development cycle 205 and adapt to deployment needs. More specifically, it allows a location of an asset (e.g. local, remote, generated, etc.) to change throughout the course of the development cycle 205 of an application without requiring a change in code (e.g., within the application) to reference the asset. Without the Addressable Assets System 100, the developer would have to change application code (e.g., to handle the additional asset loading logic) when moving an asset from a local to a remote build group. The Addressable Asset System 100, allows end-users to re-download as little data as possible as an application 174 is being updated by a developer. The Addressable Asset System 100 allows support for an easy migration process starting from an early prototype with a simple content layout to a shippable product with a more complex content layout that can span local data, multiple servers, and various platforms.

In accordance with an embodiment, as part of the runtime mode 204, at operation 520, the developer updates one or more assets for the application 174. The change may include a change of location of the asset by moving the asset to a different asset bundle (e.g., within the build process 202) talk about the build process happening many times over or changing the physical location of asset bundle files (after the build process 202). In accordance with an embodiment, at operation 522, the addressable asset module 116 updates the content catalog in real-time as the developer makes changes (e.g., at operation 520). The new location information for a changed asset is recorded in the content catalog in association with the address for the asset.

In accordance with an embodiment, the Addressable Asset System 100 uses reference counting and automatic unloading of assets loaded from asset bundles when they are no longer needed by the application 174.

It should be noted that the present disclosure can be carried out as a method, can be embodied in a system, a computer readable medium or an electrical or electro-magnetic signal. The embodiments described above and illustrated in the accompanying drawings are intended to be exemplary only. It will be evident to those skilled in the art that modifications may be made without departing from this disclosure. Such modifications are considered as possible variants and lie within the scope of the disclosure.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or with any suitable combination thereof. For example, a hardware module may include dedicated circuitry or logic that is permanently configured to perform certain operations. For example, a hardware module may be a special-purpose processor, such as a field-programmable gate array (FPGA) or an Application Specific Integrated Circuit (ASIC). A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a particular special-purpose processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Figure 6:
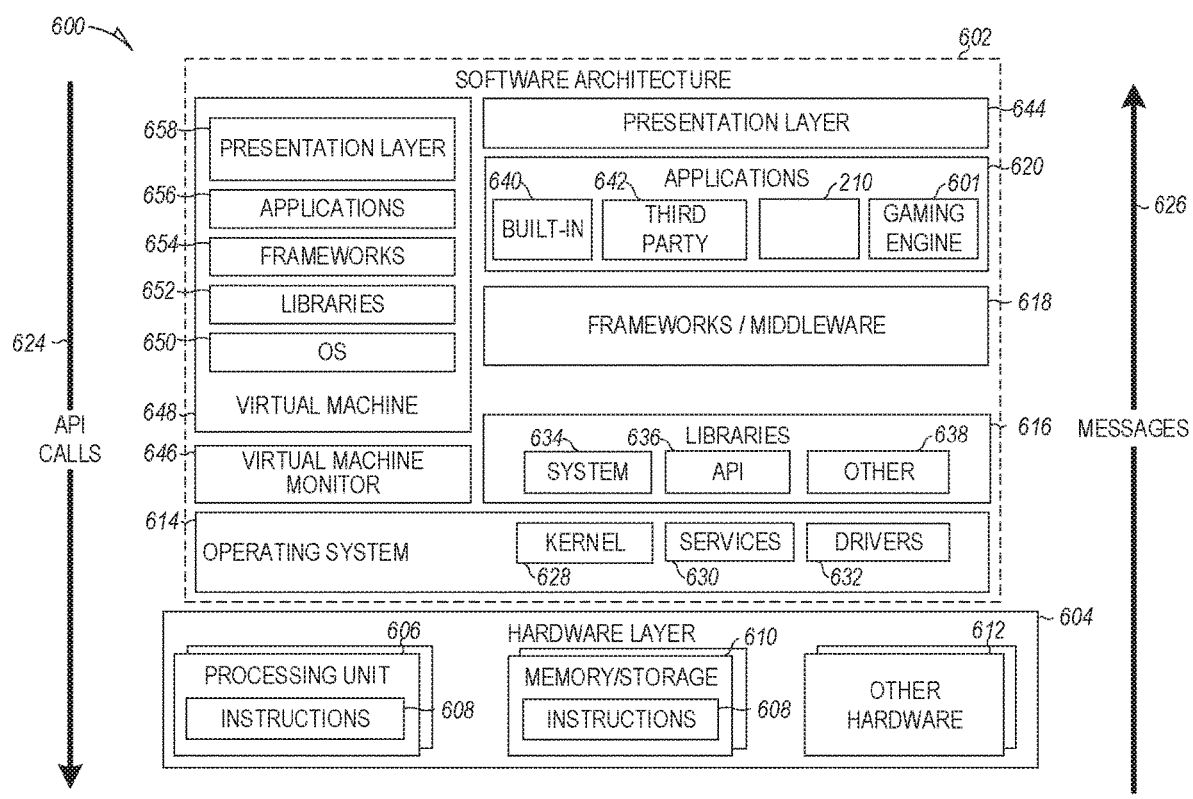
FIG. 6 is a block diagram illustrating an example software architecture, which may be used in conjunction with various hardware architectures described herein.

FIG. 6 is a block diagram 700 illustrating an example software architecture 702, which may be used in conjunction with various hardware architectures herein described to provide a gaming engine 701 and/or components of the addressable asset system 100. FIG. 6 is a non-limiting example of a software architecture and it will be appreciated that many other architectures may be implemented to facilitate the functionality described herein. The software architecture 702 may execute on hardware such as a machine 800 of FIG. 7 that includes, among other things, processors 810, memory 830, and input/output (I/O) components 850. A representative hardware layer 704 is illustrated and can represent, for example, the machine 800 of FIG. 7. The representative hardware layer 704 includes a processing unit 706 having associated executable instructions 708. The executable instructions 708 represent the executable instructions of the software architecture 702, including implementation of the methods, modules and so forth described herein. The hardware layer 704 also includes memory/storage 710, which also includes the executable instructions 708. The hardware layer 704 may also comprise other hardware 712.

In the example architecture of FIG. 6, the software architecture 702 may be conceptualized as a stack of layers where each layer provides particular functionality. For example, the software architecture 702 may include layers such as an operating system 714, libraries 716, frameworks or middleware 718, applications 720 and a presentation layer 744. Operationally, the applications 720 and/or other components within the layers may invoke application programming interface (API) calls 724 through the software stack and receive a response as messages 726. The layers illustrated are representative in nature and not all software architectures have all layers. For example, some mobile or special purpose operating systems may not provide the frameworks/middleware 718, while others may provide such a layer. Other software architectures may include additional or different layers.

The operating system 714 may manage hardware resources and provide common services. The operating system 714 may include, for example, a kernel 728, services 730, and drivers 732. The kernel 728 may act as an abstraction layer between the hardware and the other software layers. For example, the kernel 728 may be responsible for memory management, processor management (e.g., scheduling), component management, networking, security settings, and so on. The services 730 may provide other common services for the other software layers. The drivers 732 may be responsible for controlling or interfacing with the underlying hardware. For instance, the drivers 732 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 716 may provide a common infrastructure that may be used by the applications 720 and/or other components and/or layers. The libraries 716 typically provide functionality that allows other software modules to perform tasks in an easier fashion than to interface directly with the underlying operating system 714 functionality (e.g., kernel 728, services 730 and/or drivers 732). The libraries 816 may include system libraries 734 (e.g., C standard library) that may provide functions such as memory allocation functions, string manipulation functions, mathematic functions, and the like. In addition, the libraries 716 may include API libraries 736 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 716 may also include a wide variety of other libraries 738 to provide many other APIs to the applications 720 and other software components/modules.

The frameworks 718 (also sometimes referred to as middleware) provide a higher-level common infrastructure that may be used by the applications 720 and/or other software components/modules. For example, the frameworks/middleware 718 may provide various graphic user interface (GUI) functions, high-level resource management, high-level location services, and so forth. The frameworks/middleware 718 may provide a broad spectrum of other APIs that may be utilized by the applications 720 and/or other software components/modules, some of which may be specific to a particular operating system or platform.

The applications 720 include built-in applications 740 and/or third-party applications 742. Examples of representative built-in applications 740 may include, but are not limited to, a contacts application, a browser application, a book reader application, a location application, a media application, a messaging application, and/or a game application. Third-party applications 742 may include any an application developed using the Android™ or iOS™ software development kit (SDK) by an entity other than the vendor of the particular platform, and may be mobile software running on a mobile operating system such as iOS™, Android™, Windows® Phone, or other mobile operating systems. The third-party applications 742 may invoke the API calls 724 provided by the mobile operating system such as operating system 714 to facilitate functionality described herein.

The applications 720 may use built-in operating system functions (e.g., kernel 728, services 730 and/or drivers 732), libraries 716, or frameworks/middleware 718 to create user interfaces to interact with users of the system. Alternatively, or additionally, in some systems, interactions with a user may occur through a presentation layer, such as the presentation layer 744. In these systems, the application/module "logic" can be separated from the aspects of the application/module that interact with a user.

Some software architectures use virtual machines. In the example of FIG. 6, this is illustrated by a virtual machine 748. The virtual machine 748 creates a software environment where applications/modules can execute as if they were executing on a hardware machine (such as the machine 800 of FIG. 7, for example). The virtual machine 748 is hosted by a host operating system (e.g., operating system 714) and typically, although not always, has a virtual machine monitor 746, which manages the operation of the virtual machine 748 as well as the interface with the host operating system (i.e., operating system 714). A software architecture executes within the virtual machine 748 such as an operating system (OS) 750, libraries 752, frameworks 754, applications 756, and/or a presentation layer 758. These layers of software architecture executing within the virtual machine 748 can be the same as corresponding layers previously described or may be different.

Figure 7:
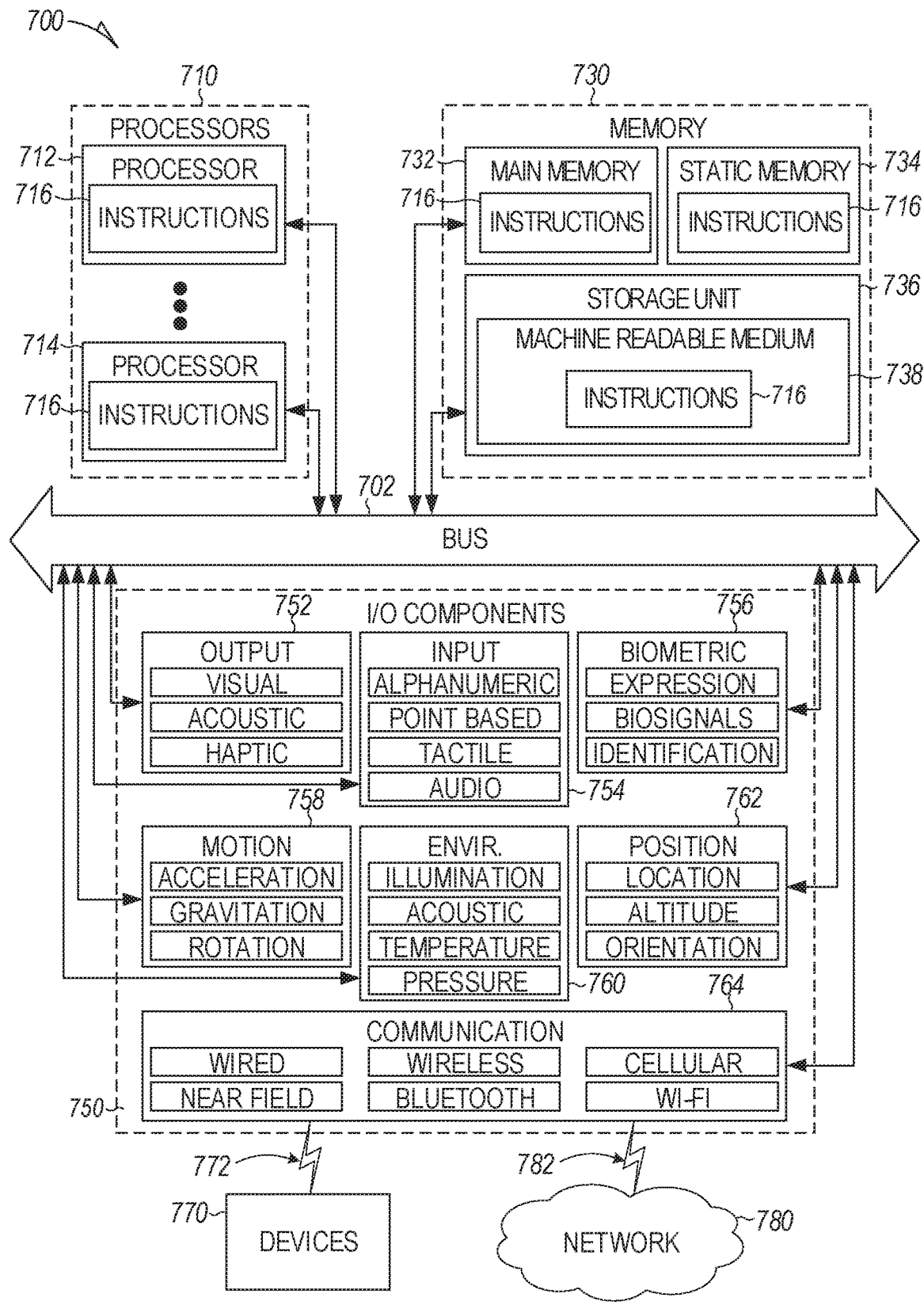
FIG. 7 is a block diagram illustrating components of a machine, according to some example embodiments, configured to read instructions from a machine-readable medium (e.g., a machine-readable storage medium) and perform any one or more of the methodologies discussed herein.

FIG. 7 is a block diagram illustrating components of a machine 800, according to some example embodiments, configured to read instructions from a machine-readable medium (e.g., a machine-readable storage medium) and perform any one or more of the methodologies discussed herein. In some embodiments, the machine 800 is similar to the developer device 102 and the user device 162. Specifically, FIG. 7 shows a diagrammatic representation of the machine 800 in the example form of a computer system, within which instructions 816 (e.g., software, a program, an application, an applet, an app, or other executable code) for causing the machine 800 to perform any one or more of the methodologies discussed herein may be executed. As such, the instructions 816 may be used to implement modules or components described herein. The instructions transform the general, non-programmed machine into a particular machine programmed to carry out the described and illustrated functions in the manner described. In alternative embodiments, the machine 800 operates as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 816, sequentially or otherwise, that specify actions to be taken by the machine 800. Further, while only a single machine 800 is illustrated, the term "machine" shall also be taken to include a collection of machines that individually or jointly execute the instructions 816 to perform any one or more of the methodologies discussed herein.

The machine 800 may include processors 810, memory 830, and input/output (I/O) components 850, which may be configured to communicate with each other such as via a bus 802. In an example embodiment, the processors 810 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 812 and a processor 814 that may execute the instructions 816. The term "processor" is intended to include multi-core processor that may comprise two or more independent processors (sometimes referred to as "cores") that may execute instructions contemporaneously. Although FIG. 7 shows multiple processors, the machine 800 may include a single processor with a single core, a single processor with multiple cores (e.g., a multi-core processor), multiple processors with a single core, multiple processors with multiples cores, or any combination thereof.

The memory/storage 830 may include a memory, such as a main memory 832, a static memory 834, or other memory, and a storage unit 836, both accessible to the processors 810 such as via the bus 802. The storage unit 836 and memory 832, 834 store the instructions 816 embodying any one or more of the methodologies or functions described herein. The instructions 816 may also reside, completely or partially, within the memory 832, 834, within the storage unit 836, within at least one of the processors 810 (e.g., within the processor's cache memory), or any suitable combination thereof, during execution thereof by the machine 800. Accordingly, the memory 832, 834, the storage unit 836, and the memory of processors 810 are examples of machine-readable media 838.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store the instructions 816. The term "machine-readable medium" shall also be taken to include any medium, or combination of multiple media, that is capable of storing instructions (e.g., instructions 816) for execution by a machine (e.g., machine 800), such that the instructions, when executed by one or more processors of the machine 800 (e.g., processors 310), cause the machine 800 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The input/output (I/O) components 850 may include a wide variety of components to receive input, provide output, produce output, transmit information, exchange information, capture measurements, and so on. The specific input/output (I/O) components 850 that are included in a particular machine will depend on the type of machine. For example, portable machines such as mobile phones will likely include a touch input device or other such input mechanisms, while a headless server machine will likely not include such a touch input device. It will be appreciated that the input/ output (I/O) components 850 may include many other components that are not shown in FIG. 1. The input/output (I/O) components 850 are grouped according to functionality merely for simplifying the following discussion and the grouping is in no way limiting. In various example embodiments, the input/output (I/O) components 850 may include output components 852 and input components 854. The output components 852 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 854 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the input/output (I/O) components 850 may include biometric components 856, motion components 858, environmental components 860, or position components 862, among a wide array of other components. For example, the biometric components 856 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 858 may include acceleration sensor components (e.g., accelerometer), gravitation sensor components, rotation sensor components (e.g., gyroscope), and so forth. The environmental components 860 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 862 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The input/output (I/O) components 850 may include communication components 864 operable to couple the machine 800 to a network 880 or devices 870 via a coupling 882 and a coupling 872 respectively. For example, the communication components 864 may include a network interface component or other suitable device to interface with the network 880. In further examples, the communication components 864 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 870 may be another machine or any of a wide variety of peripheral devices (e.g., a peripheral device coupled via a Universal Serial Bus (USB)).

Moreover, the communication components 864 may detect identifiers or include components operable to detect identifiers. For example, the communication components 864 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 862, such as, location via Internet Protocol (IP) geo-location, location via Wi-Fi® signal triangulation, location via detecting a NFC beacon signal that may indicate a particular location, and so forth.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within the scope of embodiments of the present disclosure as represented by the appended claims. The specification and drawings are, accordingly, to be regarded in an illustrative rather than restrictive sense.

The invention claimed is:

1. A system comprising:
a device that includes one or more memories and one or more computer processors, the one or more memories including a set of instructions, the set of instructions configuring the one or more computer processors to perform operations comprising:
creating a catalog entry within a catalog for a first asset, the catalog entry including at least an address and location data, the address being a unique identifier for the first asset and the location data being a description of a location of the first asset;
receiving a request from an application for asset data associated with the first asset, the request including the address;
using the address and the catalog entry to determine the location data associated with the address;
using the determined location data to retrieve the asset data at the determined location; and
returning the retrieved asset data to the application.

2. The claim of system 1, wherein the addressable asset module further configures the one or more computer processors to build an executable version of the application, the executable version including data that provides a link to the catalog.

3. The system of claim 1, wherein the first asset depends on additional data from a second asset and whereby the addressable asset module further configures the one or more computer processors to perform operations comprising:
storing the additional data within one or more files within a location within the one or more memories or an additional memory;
adding an additional address for the second asset to the catalog entry associated with the first asset; and
adding data describing the location of the additional data to the entry associated with the first asset.

4. The system of claim 3, wherein retrieving the asset data for the first asset includes detecting the dependence on the second asset, and wherein the operations further comprise:
using the additional address and the catalog to determine the location of the additional data;
using the determined location to retrieve the additional data; and
returning the retrieved additional data to the executing application.

5. The system of claim 1, wherein the developer device is communicatively coupled to a server, wherein the server includes the catalog, the operations further comprising:
sending the request to the server; and
receiving a response from the server that includes either a location for the requested data or the data itself.

6. The system of claim 1, the operations further comprising:
receiving the asset data for the first asset, the asset data describing associated digital content within the application; and
storing the asset data within one or more files within a location within the one or more memories or an additional memory.

7. The system of claim 6, wherein the storing of the asset includes creating an asset bundle for an executable version of the application, the asset bundle including a plurality of assets and associated asset data.

8. The system of claim 6, wherein the operations further include:
detecting a change in location of the one or more files from the location to a second location; and
configuring the one or more computer processors to modify the location data within the catalog entry with data describing the second location.

9. A method comprising:
creating a catalog entry within a catalog for a first asset, the catalog entry including at least an address and location data, the address being a unique identifier for the first asset and the location data being a description of a location of the first asset;
receiving a request from an application for asset data associated with the first asset, the request including the address;
using the address and the catalog entry to determine the location data associated with the address;
using the determined location data to retrieve the asset data at the determined location; and
returning the retrieved asset data to the application.

10. The method of claim 9, wherein the first asset depends on additional data from a second asset and whereby the addressable asset module further configures the one or more computer processors to perform operations comprising:
storing the additional data within one or more files within a location within one or more memories;
adding an additional unique address for the second asset to the catalog entry associated with the first asset;
adding data describing the location of the additional data to the entry associated with the first asset; and
wherein the retrieving of the asset data for the first asset includes detecting the dependence on the second asset, using the additional address and the catalog to determine the location of the additional data, using the determined location to retrieve the additional data, and returning the retrieved additional data to the executing application.

11. The method of claim 9, including:
receiving the asset data for the first asset, the asset data describing associated digital content within the application; and
storing the asset data within one or more files within a location within the one or more memories or an additional memory.

12. The method of claim 11, including:
detecting a change in location of the one or more files from the location to a second location; and
configuring the one or more computer processors to modify the location data within the catalog entry with data describing the second location.

13. A non-transitory machine-readable storage medium including a set of instructions that, when executed by one or more computer processors, causes the one or more computer processors to perform operations comprising:
creating a catalog entry within a catalog for a first asset, the catalog entry including at least an address and location data, the address being a unique identifier for the first asset and the location data being a description of a location of the first asset;
receiving a request from an application for asset data associated with the first asset, the request including the address;
using the address and the catalog entry to determine the location data associated with the address;
using the determined location data to retrieve the asset data at the determined location; and
returning the retrieved asset data to the application.

14. The non-transitory machine-readable storage medium of claim 13, wherein the addressable asset module further configures the one or more computer processors to build an executable version of the application, the executable version including data pointing to the catalog.

15. The non-transitory machine-readable storage medium of claim 13, wherein the first asset depends on additional data from a second asset and whereby the addressable asset module further configures the one or more computer processors to perform operations comprising:
   storing the additional data within one or more files within a location within one or more memories;
   adding an additional unique address for the second asset to the catalog entry associated with the first asset; and
   adding data describing the location of the additional data to the entry associated with the first asset.

16. The non-transitory machine-readable storage medium of claim 15, wherein retrieving the asset data for the first asset includes detecting the dependence on the second asset, the operations further comprising:
   using the additional address and the catalog to determine the location of the additional data;
   using the determined location to retrieve the additional data; and
   returning the retrieved additional data to the executing application.

17. The non-transitory machine-readable storage medium of claim 13, wherein the developer device is communicatively coupled to a server, wherein the server includes the catalog, the operations further comprising:
   sending the request to the server; and
   receiving a response from the server that includes either a location for the requested data or the data itself.

18. The non-transitory machine-readable storage medium of claim 13, the operations further comprising:
   receiving the asset data for the first asset, the asset data describing associated digital content within the application; and
   storing the asset data within one or more files within a location within the one or more memories or an additional memory.

19. The non-transitory machine-readable storage medium of claim 18, wherein the storing of the asset includes creating an asset bundle for an executable version of the application, the asset bundle including a plurality of assets and associated asset data.

20. The non-transitory machine-readable storage medium of claim 18, the operations further comprising:
   detecting a change in location of the one or more files from the location to a second location; and
   configuring the one or more computer processors to modify the location data within the catalog entry with data describing the second location.

* * * * *